United States Patent [19]

Lauber

[11] Patent Number: 4,802,556
[45] Date of Patent: Feb. 7, 1989

[54] AUTOLUBER

[75] Inventor: Michael L. Lauber, Akron, Ohio

[73] Assignee: The Firestone Tire & Rubber Company, Akron, Ohio

[21] Appl. No.: 518,886

[22] Filed: Aug. 1, 1983

[51] Int. Cl.<sup>4</sup> ............... F16N 7/12; B29H 17/10
[52] U.S. Cl. ............................ 184/102; 184/16; 156/414
[58] Field of Search ............... 184/3.1, 3.2, 6, 6.14, 184/6.28, 16, 19, 20, 22, 23, 25, 26, 29, 55 R, 102; 222/187; 134/21 B, 97, 101, 256.5, 256.51; 239/44, 49, 50, 57; 118/264, 266, 268; 156/110.1, 123, 289, 414, 416, 421; 425/107, DIG. 115

[56] References Cited

U.S. PATENT DOCUMENTS

| 1,092,337 | 4/1914 | Catterall | 184/102 |
| 1,219,196 | 3/1917 | Timko | 184/16 X |
| 1,964,401 | 6/1934 | Hueber | 184/102 X |
| 2,622,630 | 12/1952 | Cram | 184/102 X |
| 2,646,589 | 7/1953 | Quinn | 184/102 X |
| 2,988,211 | 6/1961 | Kent et al. | 184/102 X |
| 3,043,343 | 7/1962 | De Pellegrini et al. | 184/102 X |
| 4,144,114 | 3/1979 | Enders | 156/414 |
| 4,173,503 | 11/1979 | Shipman et al. | 156/289 X |
| 4,175,642 | 11/1979 | Bianchi et al. | 184/102 X |
| 4,236,421 | 12/1980 | Baba | 184/102 X |
| 4,239,565 | 12/1980 | Henley et al. | 156/414 X |

FOREIGN PATENT DOCUMENTS

| 1034572 | 7/1958 | Fed. Rep. of Germany | 184/102 |
| 560025 | 3/1957 | Italy | 184/102 |

OTHER PUBLICATIONS

FIGS. 1-4 of German Publication No. 211,275, Jun. 26, 1909.

Primary Examiner—David H. Brown
Attorney, Agent, or Firm—Ronald Brietkrenz

[57] ABSTRACT

A device for automatically lubricating the edges of the rims of a tire shaping drum including a pivoting arm member having disposed on the end thereof an absorbent member adapted to be positioned proximate to the rims of the tire shaping drum whereby lubricant may be metered to the absorbent material in order to allow the rim of the tire shaping drum to be automatically lubricated in response to control signals provided by a programmable controller.

1 Claim, 3 Drawing Sheets

AUTOLUBER

BACKGROUND OF THE INVENTION

1. Field of the Invention

This invention relates to a means for applying a lubricant to a tire shaping means. Specifically, the instant invention relates to a lubricating means employing a swinging arm member adapted to contact a lubricant impregnated member with the edge of the expanding members of a tire shaping drum in order to facilitate the removal of the tire from the shaping drum.

2. Description of the Prior Art

The rims of expanding members of tire shaping drums are conventionally lubricated manually. That is, the operator utilizes a dauber or similar means in order o manually apply a lubricant consisting of castor oil to the rims of the expanding member of the shaping drum. The lubricant facilitates the removal of the fully shaped tire from the shaping drum which normally has a tendency to adhere to the shaping drum in the bead area after the green tire carcass has undergone the shaping operation.

The manual application of the lubricant to the shaping drum increases the manual labor required to fabricate a tire and additionally results in uneven application of the lubricant to the flanges of the expanding members of the tire shaping drum. Excess lubricant applied to the tire shaping drum can be transferred to the shaped tire which will in turn interfere with later processing of the shaped tire having the lubricant disposed thereon. Specifically the presence of lubricant on the inside of the shaped tire will adversely affect the application of any release compound applied thereto resulting in an increase in incidence of problems during removal of the tire from the curing press. In addition, the use of an operator to manually apply the lubricant to the tire shaping drum is impractical in those situations where the shaping of the tire is substantially automated.

There is, therefore, a need for a means for automatically applying a measured amount of lubricant to the flanges of the expanding members of a tire shaping drum.

The instant invention solves this problem by providing an arm member having affixed thereto a lubricant impregnated member which may be selectively caused to contact the flanges of the expanding members of the tire shaping drum in order to cause a known amount of lubricant to be applied thereto automatically.

SUMMARY OF THE INVENTION

The present invention relates to a means for automatically lubricating the rims of the expanding members of a tire shaping drum in order to facilitate the removal of the shaped tire therefrom. An arm member is used in conjunction with a lubricant impregnated member disposed on the end of said arm member whereby the arm may be selectively positioned in order to cause the lubricant impregnated member to contact the rim of the expanding member of the tire shaping drum in order to apply thereto a known amount of lubricant.

DESCRIPTION OF AN EXEMPLARY EMBODIMENT

Figure 1:
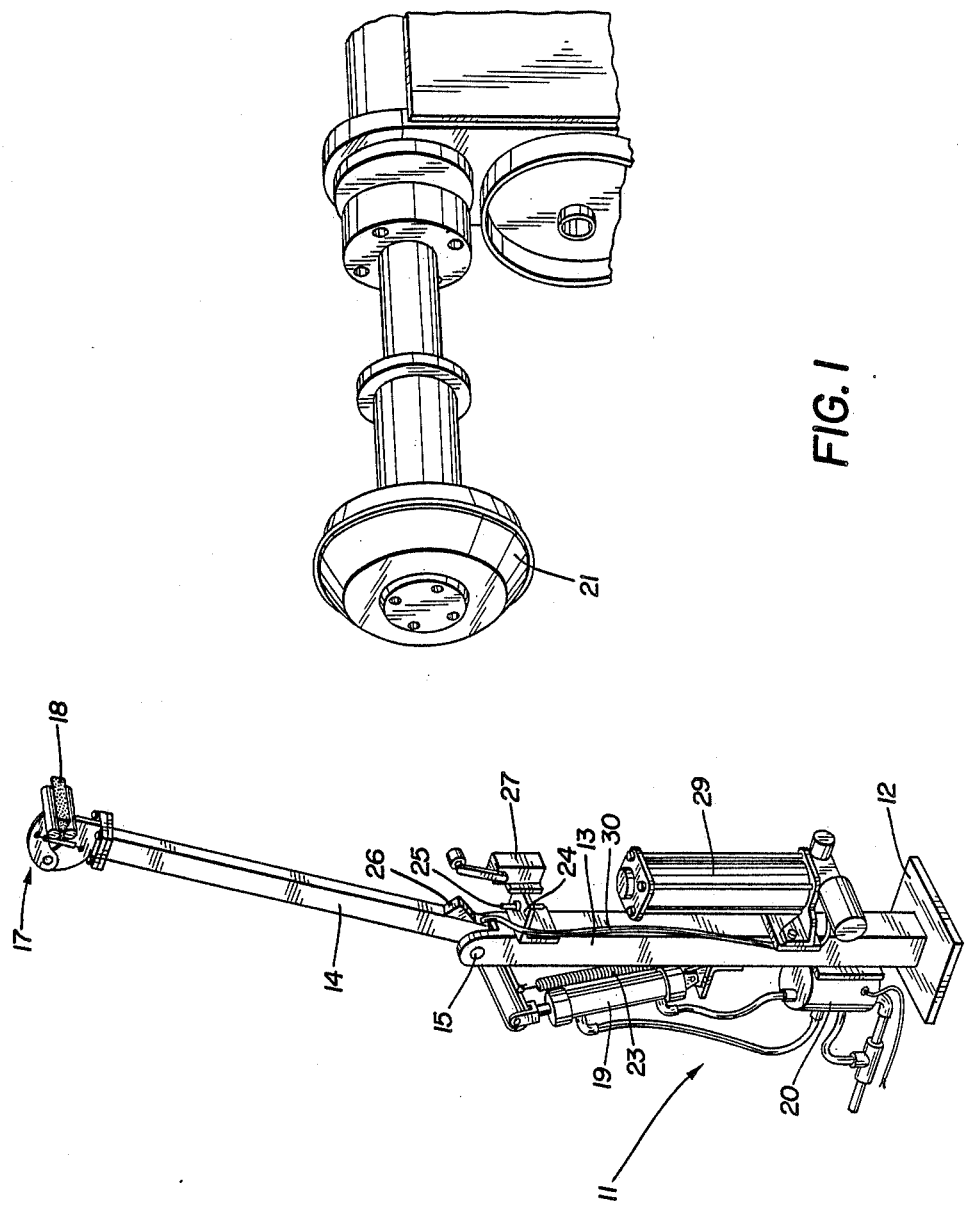
FIG. 1 is a perspective view of the instant invention disclosing its relationship with respect to a tire shaping drum.

Referring now to FIG. 1 of the drawings, there is shown the autoluber 11 of the instant invention. The autoluber 11 is comprised of a base 12 having disposed thereon vertical member 13. Pivotally mounted on the vertical member 13 near the top thereof is arm member 14 pivotally mounted by means of pivot-mount 15.

Affixed to one end of the arm member 14 is grasping means 17 which is adapted to grasp lubricant impregnated member 18 as more fully disclosed below. The opposite end of the arm member 14 has affixed thereto the clevis of air cylinder 19 which may be selectively actuated by means of valve 20 as more fully discussed below.

Figure 2:
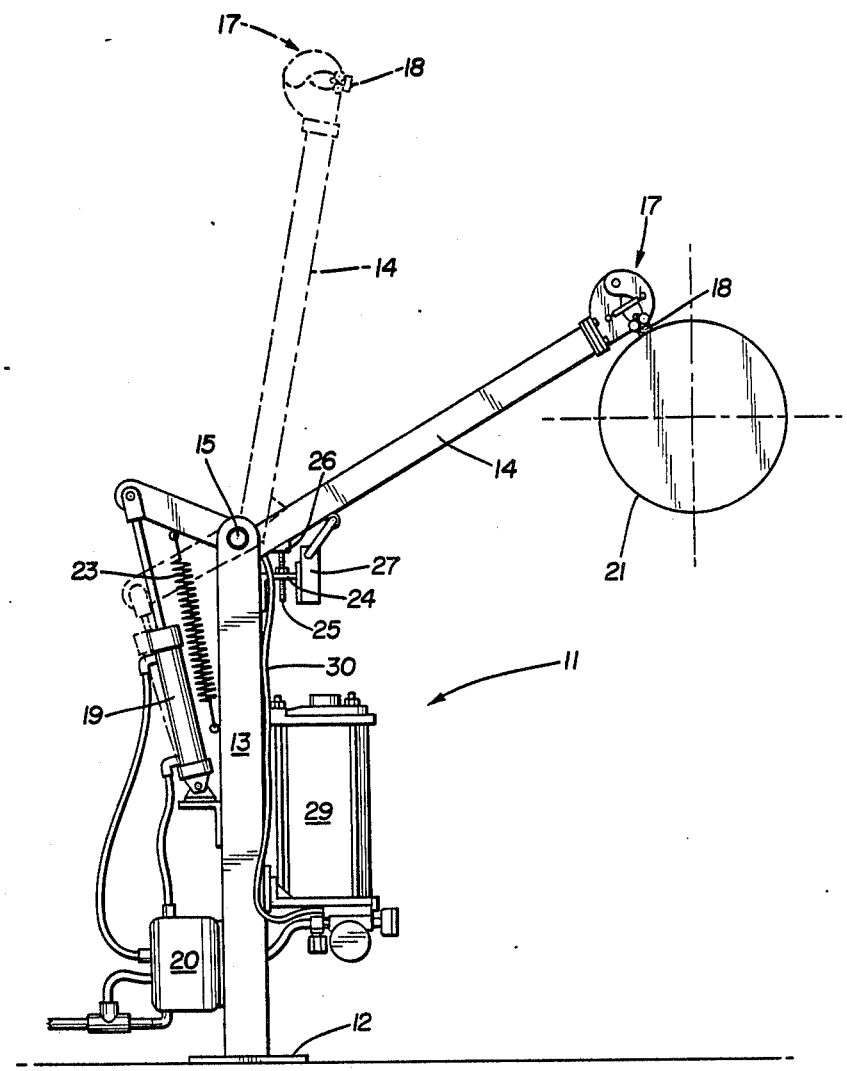
FIG. 2 is a side view of the instant invention showing the details of construction thereof.

There is thus provided a means for pivoting the vertical arm member 14 about the vertical member 13 from a position removed from the tire shaping drum 21 as disclosed in FIG. 1 of the drawings and in phantom in FIG. 2 of the drawings to a position wherein the lubricant impregnated member 18 is in contact with the expanding member of the tire shaping drum 21 as shown in the solid lines in FIG. 2 in order to apply lubricant thereto as discussed more fully below. In the exemplary embodiment the lubricant impregnated member 18 is preferably polyester foam due to its superior abrasion resistance and lubricant compatibility. The instant invention may be used in connection with a conventional tire shaping drum or may be used in conjunction with an automated tire shaping drum such as that disclosed in U.S. patent application Ser. No. 458,680 filed in the name of Earl Loeffler for a Shaping Turret, which application is hereby incorporated herein by reference.

Affixed to the arm member 14 at a position between the connection with the air cylinder 19 and the pivot-mount 15 is extension spring 23. The opposite end of the extension spring 23 is affixed to the vertical member 13. The extension spring 23 works in opposition to the air cylinder 19 as the arm member 14 is rotated about the vertical member 13 from its uppermost position to a position proximate to the tire shaping drum 21. The extension spring 23 provides a safety feature in that the arm 14 is normally spring biased towards the uppermost position.

Mounting member 24 is attached to the vertical member 13 in proximity to the pivot-mount 15. Associated with the mounting member 24 is threaded member 25 adapted to engage a similarly threaded hole in the mounting member 24 and having one end thereof disposed in the path of travel of the arm member 14 and adapted to contact with pad 26 affixed to the arm member 14 in order to provide a positive stop means for the arm member 14. It may be readily appreciated by one skilled in the art that the positive stop means may be adjusted by rotating the threaded member with respect to the mounting member 24 thereby displacing the end of the threaded member 25 with respect to the mounting member 24 causing a variable displacement of the arm member 14.

Pneumatic limit switch 27 is also affixed to the mounting member 24 and has the actuator thereof adapted to engage the underside of the arm member 14 when the arm member 14 is displaced such that the grasping means 17 and lubricant impregnated member 18 are disposed proximate to the tire shaping drum 21. The pneumatic limit switch 27 is utilized to cause lubricant to be provided to the lubricant impregnated member 18 as more fully discussed below.

Also affixed to the vertical member 13 is lubricating unit 29, which in the exemplary embodiment, is a Trabon Modu-Flo Pump Model ALS25M having a steel oil container which is adapted to provide lubricant to the lubricant impregnated member 18 via supply line 30.

There is thus provided a means for selectively pivoting the arm member 14 about the vertical member 13 in order to contact the lubricant impregnated member 18 with the tire shaping drum 21 and alternatively removing the arm member 14 and its associated lubricant impregnated member 18 clear of the tire shaping drum 21. Further there are provided means for causing lubricating oil to be provided to the lubricant impregnated member 18 in response to the lubricant impregnated member 18 being in proximity to the tire shaping drum 21. It will be readily appreciated by one skilled in the art that the instant invention is readily adapted to automatically apply a metered amount of lubricant to the tire building drum 21 without operator assistance.

Figure 4:
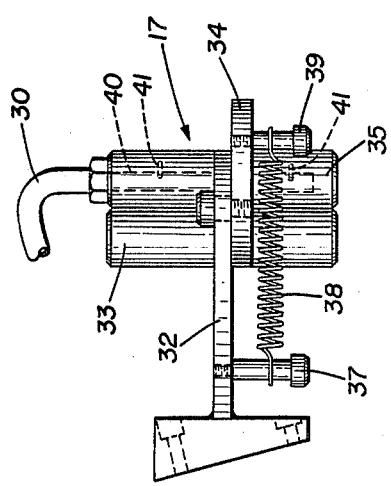
FIG. 4 is a plan view of the view of the grasping member disclosed in FIG. 3.
Figure 3:
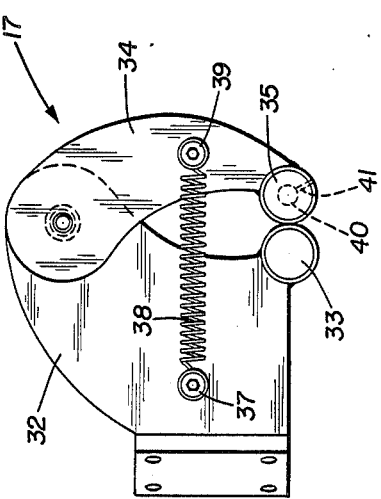
FIG. 3 is a side view of the grasping member employed by the instant invention to secure the lubricant impregnated member to the instant invention.

Referring now to FIGS. 3 and 4 of the drawings there are shown further details of the grasping means 17 employed by the instant invention. The grasping means 17 is comprised of a mounting flange 31 which is adapted to be retained on the end of the arm member 14 by bolt means. The flange mounting member 31 has fixedly attached thereto finger means 32 comprised of a flat member having associated therewith a cylindrical shaped retaining means 33. Associated with the finger means 32 and pivotally affixed thereto is second finger means 34 having associated therewith a second retaining means 35 which second retaining means is comprised of a generally cylindrical shaped member.

The mounting surface of the mounting flange 31 is angled with respect to the axis of the arm member 14 to compensate for the offset position of the autoluber 11 with respect to the plane containing the expanding members of the tire shaping drum. If the autoluber 11 was not offset, the mounting surface may be perpendicular with respect to the axis of the arm member.

Affixed to the finger means 32 is spring retaining means 37 having one end of spring 38 affixed thereto. The opposite end of the spring 38 is attached to spring retaining means 39 affixed to the finger means 34. The spring 38 causes the finger means 32 and 34 and hence their associated retaining means 33 and 35 to be spring biased with respect to each other in order to provide a grasping function. The retaining means 33 and 35 may be provided with a rough surface to further enhance the grasping function.

The retaining means 35 has an orifice 40 therein along substantially the entire length of said retaining means. The orifice is operatively connected to the supply line 30 in order that lubricant may be provided to the orifice 40. The orifice 40 has two feed lines 41 operatively connected to the orifice 40 and the surface of the retaining means 35 in order to provide a means for distributing lubricant provided by the supply line 30 to the lubricant impregnated member 18 retained by the grasping means 17.

Figure 5:
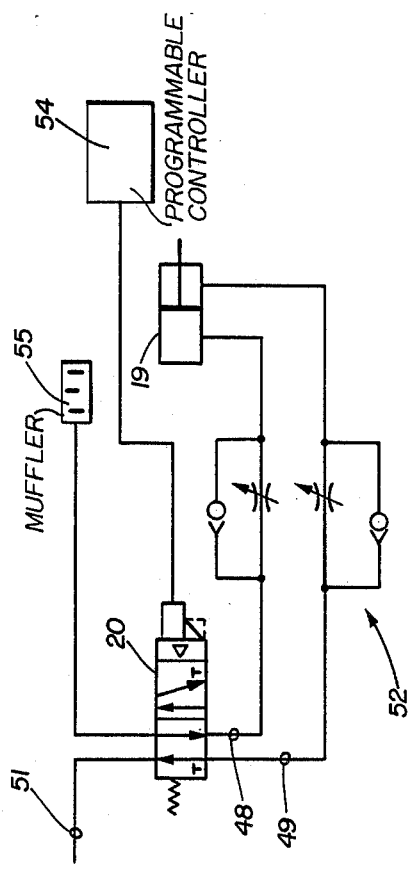
FIGS. 5 and 6 are schematic drawings of the pneumatic and electrical circuitry employed by the instant invention.

Referring now to FIG. 5 of the drawings there is shown a simplified schematic diagram of the circuitry employed by the instant invention to provide movement to the arm member 14. Compressed air is provided by air supply line 51 to control valve 20 which is in turn electrically controlled by programmable controller 54. The control valve 20 may be selectively actuated to cause the air supply line 51 to be ported to either line 48 or 49 which feed flow control valves 53 and 52 respectively. The output of the flow control valves 52 and 53 are ported to the air cylinder 19. The exhaust is ported through the muffler 55.

As shown in FIG. 5 of the drawings, the compressed air provided by the air supply line 51 to the control valve 20 is caused to provide the air supply to feed line 49 through flow control valve 52 to the air cylinder 19 causing a retraction of the rod within the barrel of the cylinder thus causing the arm member 14 to be raised. In an alternative mode of operation the air supply line 51 may be ported via control valve 20 to feed line 48 through flow control valve 53 to the air cylinder 19 causing the air cylinder 19 to expand thereby moving the arm member 14 downward towards the tire shaping drum 21.

It may thus be appreciated that there is provided a means for causing the arm member 14 to assume one of two positions in response to control commands provided by the programmable controller 54 to the solenoid actuated control valve 20 which in turn selectively ports the input air supply to the air cylinder 19 to cause the air cylinder 19 to either contract or expand thereby displacing the arm member 14 to its either uppermost position or its downward most position in proximity to the tire shaping drum 21.

Figure 6:
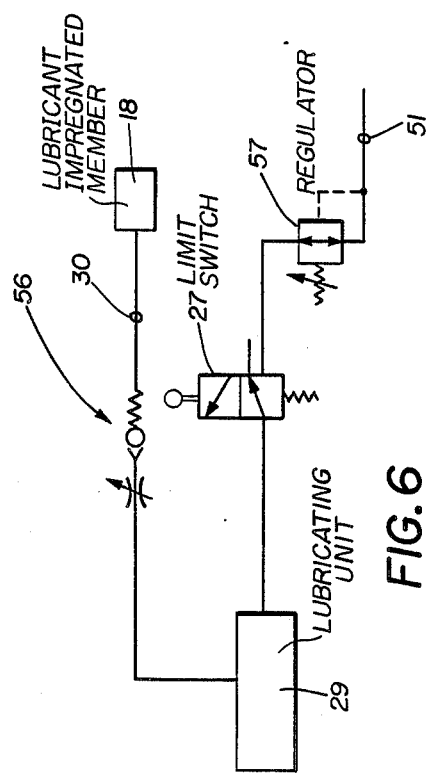

Referring now to FIG. 6 of the drawings there is disclosed a simplified schematic circuitry showing the means employed by the instant invention to provide lubricant to the lubricant impregnated member 18.

Air supply line 51 provides a source of compressed air to the regulator 57 which reduces the pressure of commonly available shop air to a lower level. The output of the regulator 57 is provided to the pneumatic limit switch 27 which coacts with the arm member 1 4 and is actuated by said arm member such that when the arm member 14 is in its downward most position in proximity to the tire shaping drum 21, the pneumatic limit switch 27 is actuated causing the air supply provided to the regulator 57 to be provided to the lubricating unit 29. When the arm member 14 is in its uppermost position however the pneumatic limit switch 27 is not actuated by the arm member 14 and hence does not provide the output of the regulator 57 to the lubricating unit 29.

The lubricating unit 29 pumps lubricant in response to pneumatic pressure provided to the lubricating unit by the pneumatic limit switch 27. The output of the lubricating unit 29 is a stream of lubricant provided to the flow control valve 56 which regulates the flow of the lubricant to the lubricant impregnated member 18 via supply line 30. The flow control valve 56 also prevents the backflow of lubricant through the supply line 30 when the arm member is in a raised position.

In the exemplary embodiment the lubricant employed by the instant invention is a mixture of approximately 4 parts castor oil to one part of isopropyl alcohol. It will be appreciated by one skilled in the art that when the pneumatic limit switch 27 is actuated by the arm member 14 the lubricating unit 29 will be caused to pump lubricant to the lubricant impregnated member via supply line 30. Due to the configuration of the feed lines in the grasping means 17 the lubricant will be allowed to drip on the lubricant impregnated member 18 in order to evenly soak the impregnated member 18 with lubricant.

There has thus been disclosed a means for automatically lubricating the edges of a tire shaping drum by utilizing a pivoting arm member actuated by a pneumatic cylinder to alternatively place in proximity to the rim of the tire shaping drum a foam pad impregnated with lubricant and alternatively causing the pad to be removed from proximity to the tire shaping drum. The lubricant is metered to the pad by a lubricating unit actuated in response to a motion of the arm member towards the tire shaping drum 21. A spring is employed to provide a safety factor causing the arm member to assume its uppermost position should the air cylinder fail. In the exemplary embodiment, the drum is rotated at least two times while the lubricant impregnated member 18 is contacting said drum in order to facilitate the application of lubricant to the drum.

It will be apparent to those skilled in the art that various modifications and additions may be made in the instant invention without departing from the essential features thereof, which are intended to be defined and secured by the appended claims.

What is claimed is:

1. An apparatus for applying a liquid to a tire shaping drum comprising:
   (a) base means;
   (b) pivot means pivotable about said base means;
   (c) fluid actuator means affixed to said pivot means and associated with said base means to cause said pivot means to pivot about said base means in response to actuation of said fluid actuator means;
   (d) liquid absorbing means associated with said pivot means;
   (e) liquid pumping means adapted to provide liquid to said liquid absorbing means through a conduit in constant fluid communication with said pumping means and said absorbing means wherein the liquid pumping means provides liquid to the liquid absorbing means in response to the pivoting of the pivot means about said base mean.

* * * * *